Oct. 9, 1923.
G. R. EVANS
AIR COOLER
Filed March 15, 1922
1,470,156
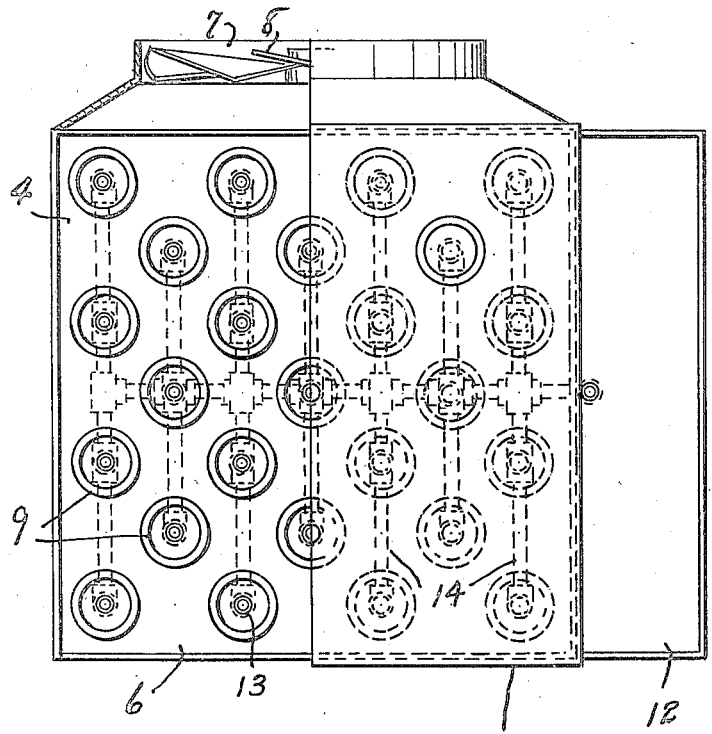
Fig. 1.
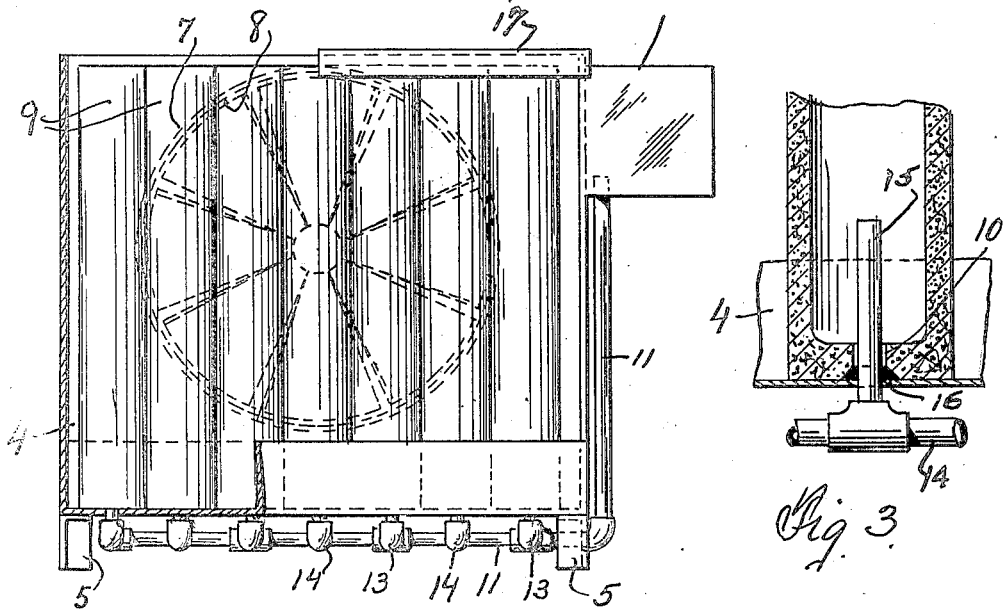
Fig. 2.
Fig. 3.
INVENTOR
GEORGE R. EVANS,
BY
Frank Waterfield
ATTORNEY Patented Oct. 9, 1923.

1,470,156

UNITED STATES PATENT OFFICE.

GEORGE R. EVANS, OF FRESNO, CALIFORNIA.

AIR COOLER.

Application filed March 15, 1922. Serial No. 543,945.

*To all whom it may concern:*

Be it known that I, GEORGE R. EVANS, a citizen of the United States, and resident of Fresno, in the county of Fresno and State of California, have invented certain new and useful Improvements in Air Coolers, of which the following is a specification.

My invention relates primarily to a system for cooling the air in the rooms of buildings and habitations and for washing the air synchronously with the cooling thereof and has for its object the provision of suitable means and devices for that purpose which will be cheap and simple in construction and operation and which will be of the maximum efficiency with the minimum cost of upkeep and operation.

Other objects and advantages will appear hereinafter and, while I have shown and will describe the preferred form of my invention, it will be understood that I do not limit myself to such preferred form but that various changes and adaptations may be made therein within the scope of the appended claims without departing from the spirit of my invention. In the drawings accompanying and forming a part hereof:

Fig. 1 is a top plan, partly broken away of my invention.

Fig. 2 is a side elevation of Fig. 1, partly in section.

Fig. 3 is an enlarged sectional detail of a portion of my invention.

Referring to the drawings my device comprises a rectangular box 4 supported at a distance from the floor by legs 5, and being open at the top. Box 4 has its front side open as at 6, and has provided in its rear wall a circular opening 7 in which is revolubly mounted a fan or blower 8 whereby, when said fan or blower is rotated, a current of air will be drawn in through opening 7 and forced out through opening 6. Mounted in box 4 to extend vertically are a plurality of tubes or containers 9 formed from plastic material of such nature that they will be porous, preferably clay or concrete, having their upper ends open and having their lower ends closed except at the center where they are provided with a concentric opening 10. Extending transversely of and beneath box 4 is a supply pipe 11 the free end of which extends upwardly at one side of said box and terminates in and communicates with a supply tank 12, mounted at one side of box 4 near the top.

Extending from the sides of pipe 11 beneath box 4 and communicating therewith are lateral pipes 13 and 14 which pipes are so positioned as to pass directly beneath the rows of containers 9 and extending upwardly from these laterals are feeder pipes 15 which pass through openings 10 in containers 9 and terminate a short distance above the bottom thereof, a packing washer 16 of rubber or other suitable material being provided to form water tight joints between said containers and pipes.

A cover 17 is provided to be detachably mounted upon the upper end of box 4 to enclose the same and prevent the admission of foreign material thereinto.

In the operation of my device the parts will be in the positions shown. Water will be admitted into tank 12 in any suitable manner. If tank 12 is connected to a water supply system suitable means will be provided to regulate the heighth of the water in said tank, such as a float or the like. The water from tank 12 will flow through supply pipe 11, lateral pipes 13 and 14 and feeder pipes 15 into containers 9, it being understood that the heighth of water in said containers will be controlled by the heighth of water in said tank 12 and that it is planned to maintain said heighth of water close to the top thereof. Containers 9 being of a porous material the water therein will be adapted to seep or percolate therethrough and the current of air being forced through box 4 will be purified and cooled through contact with said moisture. It will be noted that the alternate rows of containers 9 are staggered the purpose of which is to cause said containers to act as baffles thereby causing the air to be thoroughly cooled and washed.

Having described my invention what I claim is:

1. An air cooling device comprising a substantially rectangular box open at the top; legs supporting said box at each of the lower corners thereof; a rectangular opening in one side of said box; an opening in the opposite side of said box; an air blower mounted in said last opening adapted to force air into the interior of said box; a removable cover for the upper end of said box; a plurality of containers mounted within said box to extend vertically and being open at the top, and closed at the bottom, except at the center thereof; openings in the bottom wall of said box in register with the openings in the bottom of said containers; supply pipes extending upwardly through said last openings into said containers; a tank mounted on the side of said box the tops of said containers and said box lying in the same plane; and a connection from the bottom of said tank to said supply pipes.

2. An air cooler comprising a substantially rectangular box; legs supporting said box at each of the lower corners thereof; an opening in the top of said box; a removable closure for said last opening; a rectangular opening in one of the walls of said box; a circular opening in the opposite wall of said box; an outwardly extending rim surrounding said circular opening; a blower revolubly mounted in said circular opening concentric therewith adapted when operated to force air across said box; a plurality of containers mounted within said tank to extend vertically thereof in staggered relation, said containers being open at the top and closed at the bottom except centrally thereof; openings in the bottom wall of said box in register with the openings in the bottoms of said containers; supply pipes extending upwardly through said last openings into the interior of said containers, there being one pipe for each of said containers; a supply tank mounted on the side wall of said box at the upper end thereof; a connection from the bottom of said supply tank to said supply pipes; and means to rotate said blower.

3. An air cooler comprising a substantially rectangular box open at its upper end; a closure for said upper end; legs supporting said box at each of the lower corners thereof; openings in opposed walls of said box; a casing surrounding one of said openings extending outwardly therefrom and terminating in a reduced circular opening; an outwardly extending flange surrounding said opening; a blower revolubly mounted in said opening adapted to force air through said box; a plurality of spaced containers mounted at their lower ends upon the bottom of said box to extend vertically; openings projecting through the bottom of said containers; a packing recess in the bottom wall of each of said containers concentric with said opening, the openings in the bottom wall of said box being in register with the openings in the bottom walls of said containers; a supply pipe projecting through said openings into said containers; a packing in said packing recesses surrounding said supply pipes; a tank mounted upon the outer side of one of the closed walls of said box at the top thereof; a connection from the bottom of said supply tank to said supply pipes; and a water supply for said supply tank.

In witness that I claim the foregoing I have hereunto subscribed my name this 18th day of February 1922.

GEORGE R. EVANS.